(No Model.) 2 Sheets—Sheet 1.
E. J. TAYLOR, M. M. COCHRAN & S. ADAMS.
BICYCLE ATTACHMENT.
No. 555,271. Patented Feb. 25, 1896.
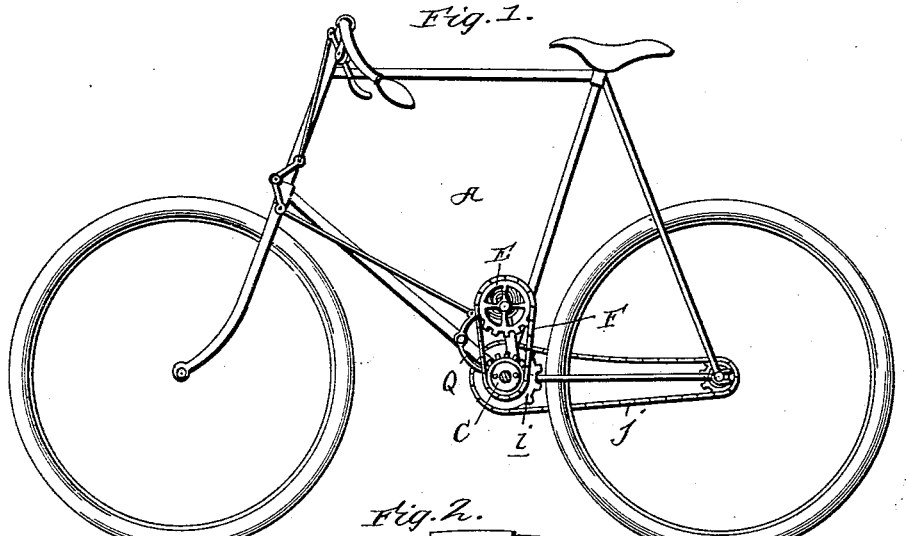
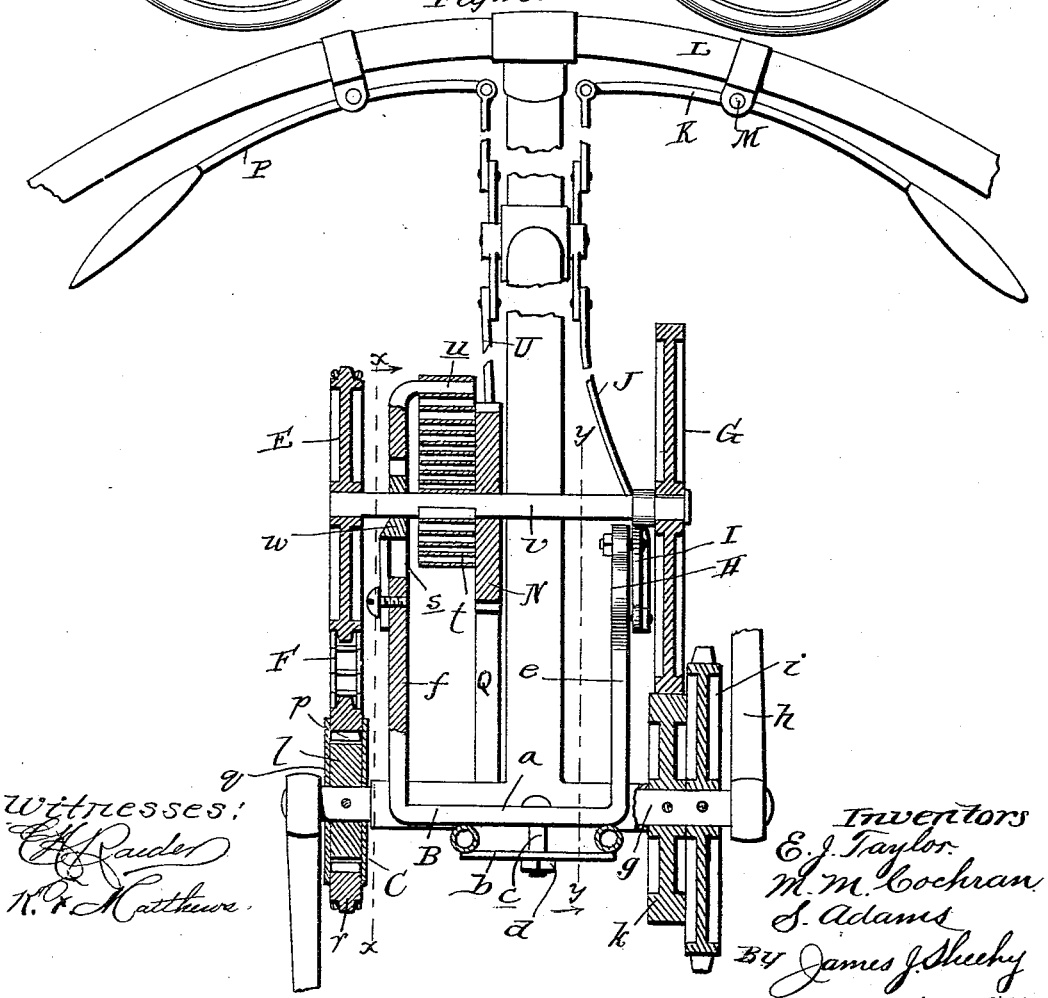
Witnesses:
Inventors
E. J. Taylor.
M. M. Cochran
S. Adams
By James J. Sheehy
Attorney (No Model.) 2 Sheets—Sheet 2.
E. J. TAYLOR, M. M. COCHRAN & S. ADAMS.
BICYCLE ATTACHMENT.
No. 555,271. Patented Feb. 25, 1896.
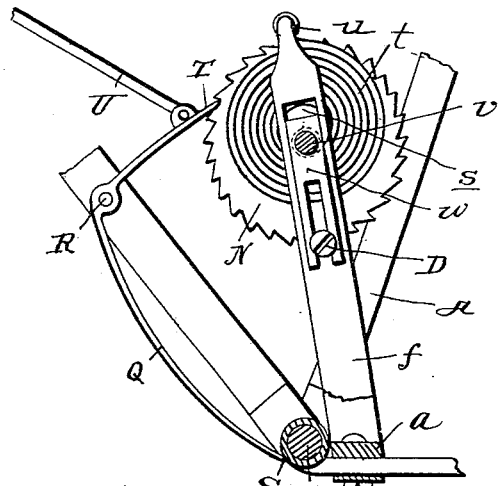
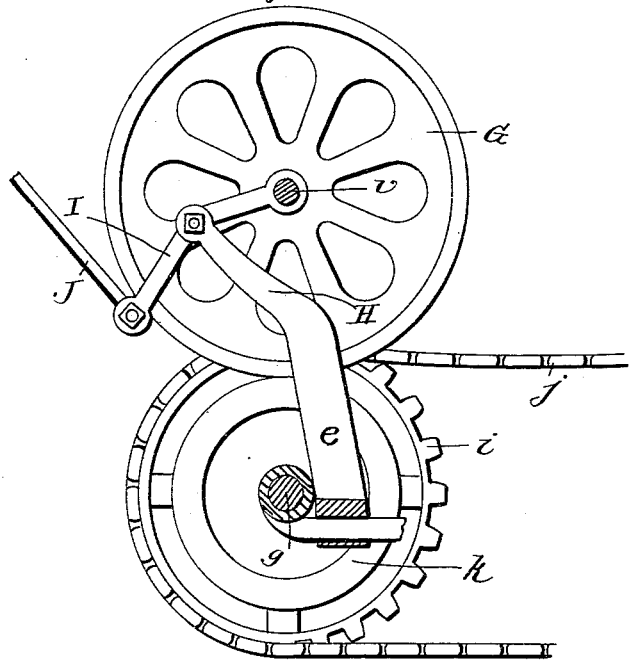
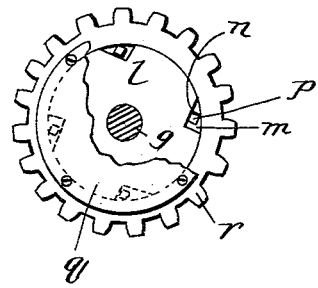
Witnesses:
C. H. Rauder
K. F. Matthews
Inventors
E. J. Taylor
M. M. Cochran
S. Adams
By James J. Sheehy
Attorney

UNITED STATES PATENT OFFICE.

EDMUND J. TAYLOR, MARTIN M. COCHRAN, AND SAMUEL ADAMS, OF TOLL GATE, WEST VIRGINIA.

BICYCLE ATTACHMENT.

SPECIFICATION forming part of Letters Patent No. 555,271, dated February 25, 1896.

Application filed October 18, 1895. Serial No. 566,146. (No model.)

*To all whom it may concern:*

Be it known that we, EDMUND J. TAYLOR, MARTIN M. COCHRAN, and SAMUEL ADAMS, citizens of the United States, residing at Toll Gate, in the county of Ritchie and State of West Virginia, have invented certain new and useful Improvements in Bicycle Attachments; and we do declare the following to be a full, clear, and exact description of the invention, such as will enable others skilled in the art to which it appertains to make and use the same.

This invention relates to improvements in bicycle attachments; and it has for one of its objects to improve upon that class of devices designed to aid or assist the rider in hill-climbing, and to also facilitate the operation of the wheel, the improvements being so adapted for operation that by the manipulation of a lever the rider while descending a grade or traveling on a smooth road may utilize the momentum of the machine to wind a spring, the force of which can be brought into action when desired.

Other objects and advantages of the invention will appear from the following description and claims when taken in connection with the accompanying drawings, in which—

Figure 1 is a side view of a bicycle with our improvements applied. Fig. 2 is a vertical central cross-sectional view taken through the improvements and illustrating parts of the bicycle-frame in elevation and broken. Fig. 3 is a sectional view taken in the plane indicated by the dotted line $x$ $x$ on Fig. 2 with parts broken away. Fig. 4 is a similar view taken in the plane indicated by the dotted line $y$ $y$ on Fig. 2. Fig. 5 is a plan view of the clutch-wheel with the shaft in section and parts broken to illustrate the interior. Fig. 6 is a perspective view of one of the brake blocks or keys.

Referring by letter to said drawings, A indicates a bicycle, which is here shown as of a diamond-frame pattern, although it is obvious that a bicycle of any construction might be employed, the one here shown being simply for the purpose of illustrating one application of our improvements and forms no part of our invention.

B indicates a frame for receiving and sustaining our improvements upon the bicycle-frame. This frame is of an angular form having a transverse horizontal portion $a$, clipped or otherwise suitably secured to the frame of the bicycle, as shown. As better seen by reference to Fig. 2, this frame B is secured by means of a plate $b$ and a bolt $c$ and nut $d$, and, while this is a convenient means of securing the frame in position, we do not wish to be understood as confining ourselves to the employment of such devices for that purpose. Rising from the horizontal portion $a$ at one end is an arm $e$, and parallel thereto at the opposite end is an arm $f$. These arms rise approximately vertical in the illustration, but they may in some cases assume an oblique position, and when a drop-frame, such as used by ladies, is employed this frame B may depend from the bicycle-frame and carry the improvements in such depending position, so as to be out of the way and afford convenience for the rider. The bicycle has the usual drive-shaft $g$ and pedals $h$, and said shaft also carries the usual sprocket-wheels $i$ to receive the drive-chain $j$.

On the shaft $g$ we fix or otherwise suitably secure a friction disk or wheel $k$, and at or near the opposite end of said shaft we provide a clutch-wheel C. This clutch-wheel is of a peculiar construction and comprises a disk $l$ of circular form having notches $m$ provided in its periphery, and these notches have an inclined wall $n$, so as to cast outwardly the friction blocks or keys $p$ placed therein when the wheel has been turned in the proper direction. On opposite sides of this disk are secured plates $q$, which are of a diameter greater than that of the disk to which they are secured, so as to form a seat between them for a toothed ring $r$. This toothed ring is designed to fit snugly over the disk $l$, and the blocks or keys are designed when the wheel has been turned in one direction to form frictional contact between the said disk and toothed wheel, so that both will turn together as one, while when the wheel has been turned in the opposite direction the keys or blocks will be thrown back in their seats so as to allow the toothed ring to turn independently of and freely upon the disk.

The arm $f$ of the frame B is provided at a suitable point in its length with a transverse slot $s$, and the upper or outer end of this arm has secured to it one end of a spring $t$, as shown at $u$, the opposite end of which is secured to a shaft $v$, which has its bearing in a bar $w$, which is adjustably secured to the arm $f$ by means of a screw D or the like. It will be seen that this shaft $v$ has its bearing or support made adjustable by the employment of the slotted bar $w$ and securing-screw, for a purpose which will presently appear. On one end of this shaft $v$ we provide a chain or sprocket wheel E, which is connected by means of a chain F or the like with the toothed ring $r$ of the clutch, so as to receive motion therefrom, and on the opposite end of said shaft is journaled a smooth wheel G, of suitable diameter.

As will be seen by reference to Fig. 4 of the drawings, the arm $e$ is deflected or bent at its upper end, as shown at H, and on the extreme end of this bent or deflected portion is fulcrumed an angular lever I, the fulcrum-point being at the angle or adjacent thereto. One end of this lever is connected with the shaft $v$, as shown, and the opposite end is connected to one end of a rod J, which rod extends upwardly and is suitably connected with a hand-lever K, journaled to the handle-bar L of the wheel, as shown at M, and the handle of said lever is brought to a point so as to be conveniently grasped by the rider. The wheel G is normally disengaged from the friction band or wheel $k$, and when it is designed to bring the two into engagement it is simply necessary for the driver to manipulate the hand-lever K so as to force down the wheel G upon the friction band or wheel $k$.

N indicates a ratchet-wheel, which is secured to the shaft $v$, and is here shown as on the inner side of the spring $t$. This ratchet-wheel is designed to control the unwinding of the spring, and is manipulated by a hand-lever P, which is journaled on the handle-bar opposite the hand-lever K and in a similar manner.

Q indicates a pawl, which is here shown as of the spring type, although one of other suitable construction might be employed. This pawl is pivoted at an intermediate point in its length to one of the bars of the frame, as shown at R, and bears at one end against another bar of the frame, as shown at S, while the opposite end T is designed to engage the teeth of the ratchet-wheel, and at this latter end or at a suitable point therefrom the said ratchet is connected with a rod U, which is in turn connected with the hand-lever P.

In operation, when it is desired to wind the spring from which the power is to be obtained, it is simply necessary for the rider while the wheel is in motion, such as descending a grade or traveling where but little exertion is required to propel the wheel, to draw up the handle end of the lever K. This movement, through the medium of the rod J and the lever I, will depress the wheel G, bringing it in frictional contact with the band or wheel $k$, and thereby impart rotary motion to said wheel G, turning the shaft $v$ and winding the spring $t$ thereon, the pawl, through the medium of the ratchet-wheel, holding the spring in such wound position. The turning of the shaft $v$ will of course turn the sprocket-wheel E thereon and, through the medium of the chain F, will turn the toothed ring of the clutch-wheel, but as said ring will not be engaged by the friction keys or blocks in this movement it will of course turn freely upon the disk $l$, so that said disk may remain idle on the shaft $g$, and consequently not affect the driving mechanism of the wheel. The spring being thus wound, the rider by releasing his grasp on the hand-lever K will allow the wheel G to disengage from the wheel or band $k$, which will cause the winding operation of the spring to cease, when the spring can be held in such wound position for an emergency and will in no manner affect or be affected by the operation of the wheel. When it is desirable to bring the spring into action, such as in climbing a hill or traveling on a rough road, the operator should grasp and draw up the handle end of the lever P. This will draw the pawl out of engagement with the teeth of the ratchet and allow the spring to unwind. The unwinding of the spring will turn the sprocket-wheel E in an opposite direction and, through the medium of the chain F, will reverse the movement of the sprocket-wheel which is fixed to the shaft $g$, the toothed ring $r$ of the clutch being in this movement held in contact with the disk $l$ through the medium of the keys or friction-blocks $p$, so that the motion received will be imparted to the driving mechanism of the wheel through the medium of the shaft $g$ and chain $j$.

While the wheel G has so far been described as a means of obtaining motion for the shaft $v$, this wheel also serves the additional function of a brake, and while it is particularly adapted to serve in connection with our improved power device yet it can be used independently as a brake and may be applied to any wheel.

While we have described very specifically and in detail the parts and their combinations as shown, yet we are aware that many of them will permit of modifications. For instance, the friction disk or band $k$ may be formed integral with the sprocket or chain wheel $i$, and may be made by forming an annular flange thereon. The plates of the clutch-wheel may be secured either to the disk or the toothed ring and the friction-keys employed in the clutch may be of a circular form in cross-section, or balls might be employed, and there are many other parts which might be changed by the mechanic without departing from the spirit of our invention. It may be desirable in practice to inclose the spring in a casing to exclude dust, moisture, and the angular arm of the frame B may in some cases be made straight. It may be also desirable to employ two springs instead of one, as we have shown, and in such cases the second spring can be arranged on the shaft between the ratchet-wheel and the wheel G.

Should the springs be unwound and there is a hill to be ascended immediately after mounting wheel, the spring or springs, as the case may be, can be wound to the highest tension by the rider before mounting the wheel turning the pedal-crank backwardly.

Having described our invention, what we claim is—

1. In a velocipede, the combination of a shaft connected with and adapted to transmit motion to a drive-wheel, a clutch-wheel mounted on said shaft and comprising a member fixed so as to turn with the shaft, a loose member having gear-teeth, and an automatic device adapted to permit the fixed member to turn forward with respect to the loose member and also adapted to automatically lock the members together when the loose member is turned forward, a motor-shaft, a gear-wheel fixed on said shaft and connected with the loose gear member of the clutch-wheel on the drive-shaft, a spring connected with and adapted to rotate the motor-shaft, and mechanism for transmitting motion from the drive-shaft to the motor-shaft to wind the spring, substantially as and for the purpose set forth.

2. In a velocipede, the combination of a rotatable motor-shaft adapted to be laterally moved, a spring connected with and adapted to rotate said shaft, the gear-wheel, the ratchet-wheel and the friction-wheel fixed on said motor-shaft, the drive-shaft connected with and adapted to transmit motion to a drive-wheel, a clutch-wheel mounted on said drive-shaft and comprising a member fixed so as to turn with the shaft, a loose member having gear-teeth and connected with the gear-wheel on the motor-shaft and an automatic device adapted to permit the fixed member to turn forward with respect to the loose member and also adapted to automatically lock the members together when the loose member is turned forward, the friction-wheel fixed on the drive-shaft and adapted to be engaged by the friction-wheel on the motor-shaft, a pawl normally engaging the ratchet-wheel on the motor-shaft, and means for disengaging the pawl from the ratchet-wheel and moving the motor-shaft so as to carry the friction-wheel thereon into engagement with the friction-wheel on the drive-shaft, substantially as specified.

3. The combination with a bicycle-frame; of a rotatable shaft, a spring secured at one end to said shaft, and at its opposite end to a suitable frame, the ratchet-wheel also secured to the shaft, the sprocket-wheel on one end of said shaft, and the wheel G, on the opposite end thereof, the clutch-wheel on the drive-shaft, the chain connecting the clutch-wheel with the sprocket-wheel, the friction-wheel adapted to be engaged by the wheel G, a pawl normally engaging the ratchet-wheel and means for moving the pawl and moving the wheel G, in and out of engagement with the friction-wheel, substantially as specified.

In testimony whereof we affix our signatures in presence of two witnesses.

EDMUND J. TAYLOR.
MARTIN M. COCHRAN.
SAMUEL ADAMS.

Witnesses:
H. L. BROADWATER,
CREED WILSON.